United States Patent Office 3,423,197
Patented Jan. 21, 1969

3,423,197
METHOD OF FORMING A GLASS SHEET ON A MOLTEN METAL BATH
David Gordon Loukes, Eccleston Park, Prescot, and Roy Smith, Rainhill, England, assignors to Pilkington Brothers Limited, Liverpool, England, a company of Great Britain
No Drawing. Filed June 21, 1965, Ser. No. 465,732
Claims priority, application Great Britain, June 23, 1964, 25,952/64
U.S. Cl. 65—32                                    5 Claims
Int. Cl. C03b 18/02

---

ABSTRACT OF THE DISCLOSURE

Treating flat glass, which has been contacted with molten metal, to render harmless the resultant impurities in the surface of the glass, by treating the glass coming from the molten metal at an elevated temperature, e.g. 450–600° C. under non-oxidising conditions, to render the harmful impurities harmless.

---

This invention relates to flat glass.

In the manufacture of flat glass in which glass is in contact with a molten metal, for example a method in which flat glass is manufactured in ribbon form on a bath of molten tin or tin alloy, it is found that the surface of the flat glass which has been in contact with the molten metal may acquire impurities from the molten metal, for example a small percentage of the metal, probably in the form of a compound, may be present in the surface. For some applications of the glass, the presence of impurities which the glass surface has acquired from the molten metal may lead to undesirable results and accordingly it is an object of the present invention to provide a means for rendering harmless such harmful impurities in the glass surface.

According to the present invention there is provided a method of treating flat glass which, during its manufacture, has been in contact with molten metal, the method comprising the step of improving the surface characteristics of the glass by maintaining the glass at an elevated temperature, under conditions which prevent oxidation of at least the surface of the glass which has been in contact with the molten metal, for a period of time sufficient to render harmless those harmful impurities which have entered the glass surface as a result of its having been in contact with the molten metal.

More particularly according to the present invention there is provided a method of manufacturing flat glass in ribbon form and having a polished surface comprising supporting the glass in ribbon form on a bath of molten metal, removing the glass ribbon from the bath and then maintaining the glass ribbon at an elevated temperature of the order of 400° C. to 650° C. with at least the surface of the glass which has been in contact with the molten metal under conditions which prevent oxidation of that surface of the glass for a sufficient time to render harmless those harmful impurities which have entered the said surface of the glass, whilst preserving the polished nature of the glass sheet.

The conditions which prevent oxidation of the surface of the glass which has been in contact with the molten metal may be achieved by virtually isolating the glass from any surroundings, in other words, by placing the glass in a chamber from which the atmosphere is substantially evacuated so that the glass is effectively in a vacuum while it is maintained at the elevated temperature. Advantageously the gas pressure in the chamber, while the glass is maintained at the elevated temperature, is less than 1 mm. of mercury.

When flat glass is manufactured in ribbon form in contact with molten metal, generally only one surface of the glass is in contact with the molten metal so that impurities acquired from the molten metal will be present in this one surface only. Consequently, in accordance with the present invention, it is this one surface which is maintained under conditions which prevent oxidation while the glass is maintained at an elevated temperature.

This one surface may be so maintained by, for example, contacting substantially the whole surface area with a non-oxidising gas which is preferably also at an elevated temperature of the order of 400° C. to 500° C. The non-oxidising gas which is used may be a gas which is substantially inert to the glass. Alternatively in a method of treatment according to the present invention, the glass may be passed over the surface of a bath of a liquid at a temperature of the order of 400° C., with the surface of the glass which was in contact with the molten metal in contact with the liquid, the liquid being one which is not harmful to the surface of the glass. As a further alternative the glass may be totally immersed in such a liquid. As examples, the liquid used may be molten metals, preferably molten bismuth, at temperatures of the order of 400° to 650° C., when the glass would float on the surface of the molten bismuth, or a molten mixture of sodium chloride, potassium chloride and lithium chloride at a temperature of the order of 600° C. In this latter case the glass will be immersed in the molten mixture.

According to a preferred feature of the present invention there is provided a method of treating flat glass which, during its manufacture, has been in contact with molten metal, the method comprising the step of improving the surface characteristics of the glass by maintaining the glass at an elevated temperature in a non-oxidising atmosphere which is inert to the glass for a period of time sufficient to render harmless those harmful impurities which have entered the glass surface as a result of its having been in contact with the molten metal.

It has previously been proposed, for example in U.S.A. Patent No. 3,083,551, to manufacture flat glass in ribbon form on a bath of molten tin or other metal which should be substantially inert with respect to the material from which the confining tank is made, substantially inert to the atmosphere above the bath and in any case, should be substantially incapable of forming reaction products which would adversely affect the quality of the glass; metals which were found to fulfill all the requirements of the bath were tin and lead, and the present invention has aplication to the treatment of such flat glass. According to this aspect therefore, the present invention provides a method of treating flat glass which has been manufactured on a bath of molten tin (or lead, as above,) and which is in ribbon form and which has a polished surface, the method comprising the step of improving the characteristics of the glass surface which has been in contact with the molten tin by maintaining the glass at an elevated temperature in a nonoxidising atmosphere which is inert to the glass surface for a sufficient time to render harmless those harmful impurities which have entered the said glass surface as the result of its having been in contact with the bath of molten tin, whilst preserving the polished nature of the surface.

Conveniently, the treatment of the glass is effected during course of manufacture of the glass at a time subsequent to the removal of the glass ribbon from the bath and before the glass ribbon has been cooled completely to room temperature. According to this aspect of the invention therefore there is provided a method of manufacturing flat glass in ribbon form and having a polished surface comprising supporting the glass in ribbon form on a bath of molten metal, removing the glass ribbon from the bath and then maintaining the glass ribbon at an elevated temperature of the order of 400° C. to 650° C. in a non-oxidising atmosphere which is inert to the glass surface for a sufficient time to render harmless those harmful impurities which have entered the surface of the glass ribbon which has been in contact with the molten metal, whilst preserving the polished nature of the glass surface.

Although tin is the preferred material for the bath of molten metal, tin alloys having a specific gravity greater than the specific gravity of the molten glass may be employed.

Advantageously, the non-oxidising atmosphere in which the glass ribbon is maintained at an elevated temperature is an atmosphere comprising nitrogen. Other gases which are inert to the glass, for example argon and helium, may be employed as substitutes for nitrogen, but nitrogen is the preferred gas because of its comparative cheapness.

Preferably, however, the non-oxidising atmosphere which is inert to the glass comprises a mixture of nitrogen and hydrogen. The hydrogen is present to react with any oxygen which may have entered the system, and the hydrogen may be only a small portion, for example 5% by volume, of the mixture.

The particular treatment to which the glass is subjected in the nitrogen atmosphere will depend on the nature of the glass and the degree of harmful impurity which may be present in the surface of the glass, for example the glass may be maintained at a temperature in the range of 400° C. to 650° C. for a time of the order of fifteen minutes. On the other hand, similar treatments may be effected in a particular glass having a given degree of impurity by treating the glass either at a temperature of the order of 650° C. for a period of the order of fifteen minutes or by maintaining the glass in the non-oxidising atmosphere which is inert to the glass at a temperature of the order of 500° C. for a time of the order of thirty minutes.

When the treatment of the glass is carried out on a ribbon of glass, the glass ribbon which is taken up from the surface of the bath of molten metal is advantageously fed directly into a chamber containing an atmosphere of nitrogen, preferably having a small proportion of hydrogen also present. The glass ribbon emerging from the outlet end of a tank structure containing a bath of molten metal is at a temperature of the order of 650° C. and is conveniently maintained at a temperature in the range of 650° C. to 600° C. in the chamber, each part of the glass ribbon being within the chamber for a period of fifteen minutes or longer, depending on the degree of contamination of the glass surface. The glass ribbon after treatment in the chamber is fed to an annealing lehr for annealing in the normal way. If desired, a non-oxidising atmosphere may additionally be maintained in the lehr.

Alternatively the glass ribbon may be passed into a treatment chamber containing a nitrogen-hydrogen mixture after the annealing process, but the glass is then cooler so that the glass ribbon has to be maintained in such a chamber for a longer period than when the chamber is situated before the annealing lehr.

The present invention also comprehends flat glass having a polished surface whenever prepared by a method according to the invention. The flat glass may either be in ribbon form or in the form of sheets cut from a ribbon of glass.

The invention and methods of employing it will be better understood from the following detailed description of preferred examples thereof.

EXAMPLE 1

A ribbon of flat glass was manufactured on a bath of molten tin by developing the glass ribbon from the molten glass in accordance with the process described in U.S. Patent No. 3,083,551. At the outlet end of the tank structure containing the bath of molten metal such as tin the glass ribbon was taken up from the surface of the bath and was immediately conveyed into a chamber which was flooded with a nitrogen-hydrogen mixture at a temperature of about 600° C.

The glass ribbon entering the lehr is at a temperature of approximately 650° C. and emerged from the chamber at a temperature of about 600° C. after a period of about 15 minutes. The glass ribbon was then passed into an annealing lehr where the glass was cooled slowly through its annealing range. The glass was then further cooled to a temperature at which the glass ribbon can be cut into sheets and handled.

Sheets cut from the glass ribbon manufactured in accordance with the process just described were subsequently subjected to a heat treatment process in the atmosphere, for example a bending or toughening process. After the bending or toughening process in the atmosphere, both surfaces of the sheet of flat glass maintained an excellent polish and showed no visible difference from the surface of the glass obtained directly from the bath of molten tin.

EXAMPLE 2

As an alternative to the process described in Example 1, the individual sheets of glass cut from a glass ribbon may be treated separately in a batch type process instead of a continuous process.

Accordingly a ribbon of glass was manufactured on a bath of molten tin in accordance with the process described in U.S.A. Patent No. 3,083,551. Immediately after removal of the glass ribbon from the bath it was fed into an annealing lehr and from the outlet end of the annealing lehr an annealed glass ribbon was obtained. The annealed glass ribbon was cut into sheets of glass and some of these sheets of glass were placed in a chamber containing a nitrogen atmosphere, with the nitrogen being continually fed into the chamber. The glass sheet in the chamber was heated, for example by radiant heating, in the nitrogen atmosphere to a temperature of 600° C. and maintained at this temperature for fifteen minutes, after which the glass sheet was allowed to cool gradually at the rate of about 4° C. per minute to room temperature.

After this treatment, the highly polished nature of both surfaces of the glass sheet was maintained, and it was found that when the glass sheet was subjected to a heating operation in an oxygen-containing atmosphere, the polished nature of the surface which had been in contact with molten tin during the manufacture of the flat glass was still maintained.

EXAMPLE 3

Example 2 was repeated except that the glass sheet in the chamber was heated to a temperature of 450° C. instead of a temperature of 600° C. The glass sheet was maintained at a temperature of 450° C. for about half an hour and was then allowed to cool gradually at a rate of 4° C. per minute to room temperature.

The glass sheets treated in this way were subjected to a heat treatment in an oxygen atmosphere, for example bending and toughening treatments, without any change in the surfaces of the glass being apparent.

The particular advantage which is found in glass manufactured on a bath of molten metal and subjected to a treatment in accordance with the present invention is that the highly polished nature of the surface is maintained after the heat treatment in an oxygen-containing atmosphere. This is due to the fact that impurities in the glass surface which have been acquired as a result of contact between the glass surface and the bath of molten metal have been rendered harmless by the treatment according to the invention.

The explanation is thought to be that as a result of contact between the glass and the molten metal the glass acquires impurities which are capable of reacting with oxygen when the glass is subsequently heated in an atmosphere containing oxygen to spoil the highly polished nature of the glass surface obtained by the process of manufacture of the flat glass. However, by maintaining the glass at an elevated temperature and in an atmosphere which is non-oxidising and inert to the glass, at least some of these harmful impurities acquired by the glass surface are allowed to migrate, for example by diffusion, from the glass surface into the body of the glass, where they cannot react with any oxygen in the atmosphere in subsequent heat treatments.

The particular method of treatment in accordance with the present invention has the advantage over other possible methods of treating the glass surface to render harmless harmful impurities present in the surface that a performance of the treatment for a period rather longer than is absolutely necessary to render impurities harmless will not immediately introduce other defects in the surface of the glass.

We claim:

1. A method of treating flat glass which, during its manufacture, has been in contact with molten metal of the group consisting of tin and tin alloys, the method comprising the step of improving the surface characteristics of the glass by moving the glass into a chamber and maintaining the glass in the chamber out of contact with the bath and controlling the temperature of the glass in the chamber at a temperature of the order of 400° C. to 650° C. under non-oxidising conditions for from fifteen to thirty minutes to provide time for the migration from at least the lower surface of the glass into the interior of the body of the glass of an oxide of said metal which would ordinarily be oxidisable upon subsequent heat treatment of the glass, and while maintaining the glass out of contact with the bath, cooling it to a temperature at which it can be cut into sheets and handled, while preserving the polished nature of the glass.

2. A method as in claim 1 wherein said non-oxidising conditions involve the presence of a non-oxidising atmosphere.

3. A method as in claim 2 herein said non-oxidising atmosphere comprises a relatively large amount of nitrogen and a relatively small amount of hydrogen.

4. A method as in claim 1 wherein said non-oxidising conditions involve the use of a partial vacuum wherein the gas pressure is less than one millimeter of mercury.

5. A method as in claim 1 wherein said non-oxidising conditions involve the presence of non-oxidising liquid.

References Cited

UNITED STATES PATENTS 3,250,604  5/1966  Toytot et al. _____ 65—32

DONALL H. SYLVESTER, *Primary Examiner.*

A. D. KELLOGG, *Assistant Examiner.*

U.S. Cl. X.R.

65—65, 84, 99